Patented Nov. 10, 1942

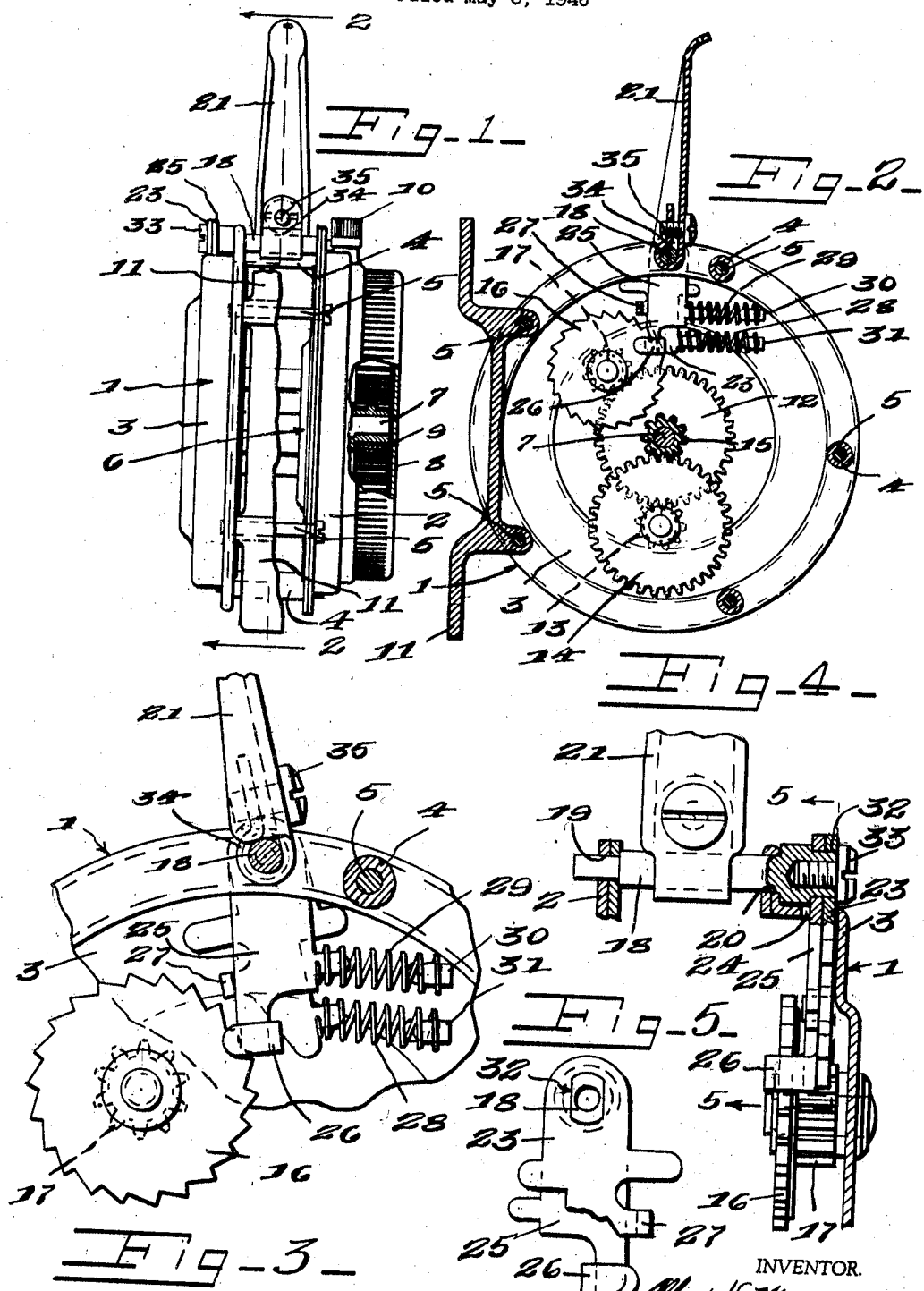

2,301,732

UNITED STATES PATENT OFFICE 2,301,732

AUTOMATIC FISHING REEL

Alfred D. Maury, Ilion, N. Y.

Application May 3, 1940, Serial No. 333,171

6 Claims. (Cl. 242—84.3)

This invention relates to automatic fishing reels, and particularly to a brake lever arrangement therefor, and has for its object a mounting for a brake lever, preferably between the side plates of the reel, which lever moves about an axis parallel to the axis of the spool and includes a short arm extending into the housing and operating a brake member therein.

It further has for its object such a lever, wherein the brake member is a pawl mounted co-axially with the axis of the lever and overlying the short arm thereof, the pawl coacting with a ratchet wheel actuated by the spring mechanism of the reel, the pawl having a rocking movement relatively to the lever, and being connected to the short arm of the lever by a lost motion connection which permits the normal ratcheting action of the pawl, and also causes the pawl to be shifted out of engagement with the ratchet wheel to relieve the braking effect, when the operating lever is operated from its normal position.

It further has for its object a brake lever mechanism including a rock shaft extending transversely of the rims of the side plates of the reel parallel to the axis of the spool, the lever including an operating arm mounted on the rock shaft between the side plates, and a short arm mounted on one end of the rock shaft outside of one of the side plates and extending through a slot in that side plate into the interior of the housing.

It further has for its object an operating arm of the brake lever mechanism, movable about the axis of the spool, which is adjustable into different initial radial angles relative to the axis of the lever to adjust the position of the lever to the particular person to suit the convenience of that person, the operating lever extending along the handle of the fish rod to which the reel is applied and movable toward and from the handle, so that the adjustment brings the lever arm nearer or farther from the handle to accommodate short or long fingers of the hand grasping the handle.

The invention consists in the novel features and in the combinations and constructions hereinafter set forth and claimed.

In describing this invention, reference is had to the accompanying drawing in which like characters designate corresponding parts in all the views.

Figure 1 is an edge view, partly broken away, of this reel.

Figure 2 is an inner face view of one of the side plates and the train of gears thereon, taken on the line 2—2, Figure 1.

Figure 3 is an enlarged fragmentary elevation of parts seen in Figure 2.

Figure 4 is a fragmentary elevation, partly in section, and parts omitted, looking to the left in Figure 3.

Figure 5 is a detail fragmentary view taken on line 5—5, Figure 4.

1 designates the housing of the reel, this being cylindrical in general form and including opposing side plates 2, 3, spacers 4, between the rims of the same, and fastening means, as screws 5, extending through the rims of the side plates 2, 3 into the spacers.

6 designates the spool or reel mounted on a spindle 7 suitably mounted in bearings in the side plates 2, 3.

8 designates a spring barrel rotatably mounted in any suitable manner on one of the side plates, as the side plate 2 of the housing, and 9 designates a coil spring within the barrel and anchored at one end to the barrel, and at its other end to a hub on the spindle 7. The spring barrel is provided with suitable peripheral ratchet teeth which coact with the spring-pressed poppet 10 or pawl carried by the housing or side plate 2 in any suitable manner. This spring-pressed poppet 10 is for holding the spring under tension and it is operable to release the spring barrel to permit the spring to be untensioned, as when the reel is to be laid away or not used.

The housing is provided with suitable seats or lugs 11 for attachment to the handle or butt of the fish pole by the usual slip rings. The seats are so arranged at the periphery of the housing that the brake lever, to be described, has an operating movement toward the handle of the pole, that operates pinch-handle fashion.

The motion transmitting means between the spring 9 and the spool 6 includes, in addition to the spindle 7, a gear 12 mounted on the end of the spindle 7 remote from the spring 9 to rotate with the spindle, a pinion 13 meshing with the gear 12 and mounted on a suitable stud or spindle carried by the side plate 3, a gear 14 rotatable with the pinion 13 and here shown as mounted on the hub thereof and meshing with a pinion 15 on the hub of the spool 6. Upon rotation of the spindle 7 by the spring 9, the motion is transferred to the spool 6 through the gear train 12, 13, 14 and 15, and upon rotation of the reel by the pull of the line wound on the reel, the spindle 7 is rotated and the spring re-wound through the train of gears in the reverse order.

The mechanism thus far described is substantially the same as that shown in my Patent No. 2,175,756 issued October 10, 1939.

The brake mechanism forming the subject matter of this invention comprises a brake wheel located in the housing and connected in the train of gears 12, 13, 14 and 15 to be actuated by said train, a brake member coacting therewith, and an operating lever mounted on a transverse axis extending parallel to the axis of the spool, that is, parallel to the spindle 7, and having a long arm constituting the finger-piece extending in a general radial direction from the housing, and a short arm extending into the housing and carrying a brake member coacting with said brake wheel, the brake member being mounted coaxially with the axis of the lever and overlying the short arm of the lever, and having a movement about its axis relatively thereto. The short arm of the lever and the brake member are connected by a lost motion connection, which permits movement of the brake member relative to the short arm, and also establishes a coupling between the short arm and the brake member to move the brake member out of coaction with the brake wheel when the brake lever is operated.

The brake wheel is here shown as a ratchet wheel 16 suitably mounted on the inner side of the side plate 3 and it is connected in the train of gears by a pinion 17 rotatable therewith and meshing with the gear 12. The mounting of this ratchet wheel is also substantially the same as shown in my Patent No. 2,175,756. The brake lever includes a rock shaft 18 suitably mounted in the margins or rims of the side plates 2, 3, respectively, at 19 and 20, a lever arm 21 constituting a finger-piece mounted on the rock shaft between the side plates 2, 3, a short lever arm 23 mounted on the shaft 18 on the outside of the rim of the side plate 2, and extending through a slot 24 to the inner side of the side plate 3 into a position adjacent the brake wheel 16. The brake member is a pawl 25 mounted on the rock shaft 18 outside of the rim of the plate 3 and extending through the slot 24 into the inner side of the plate 3, the pawl overlying the short arm 23 and having a rocking movement about or relative to the shaft 18, and hence the short arm 23. The pawl has a tooth 26 coacting with the teeth of the ratchet wheel 16, this pawl being shaped to work astride the ratchet wheel to hold it in juxtaposition thereto. One of these parts 23, 25, as the short arm 23, is formed with a lug 27 extending into the path of the pawl 25 and normally spaced therefrom to permit the ratcheting action of the pawl. This lug 27 operates to shift the pawl entirely out of engagement with the ratchet wheel, upon operation of the brake lever and hence release the ratchet wheel, and hence the spool of the braking action, it being understood that the braking action is due to the friction between the pawl and the ratchet teeth of the ratchet wheel.

Spring means are provided for returning the lever to its normal position, when released by the operator, and also for permitting ratcheting action of the pawl. This spring means is preferably two springs, one spring 28 acting on the inner end of the short arm 23 and the other spring 29 acting on the pawl. The springs are suitably mounted on the inner face of the side plate 3 and suitably interlocked, as by means of lugs 30, 31, with the pawl and with the short arm 23 of the operating lever. The short arm of the operating lever is suitably keyed or secured to the rock shaft 18, it being formed with a non-circular opening fitting over a non-circular portion 32 on the rock shaft, and the pawl 25 is formed with a round opening slidably fitting on a circular portion of the shaft 18. A suitable screw 33 threading axially into the shaft 18 rigidly secures the short arm 23 to the shaft 18. The side plate 3 is shown as slightly cup-shaped or in the form of a shallow cup, and the slot 24 through which the short arm 23 and the pawl 25 extend, is provided in the circular wall of the cup-shaped formation.

The operating arm or finger-piece 21 extends along the handle of the fish rod and is operable toward the handle to release the brake by a finger of the hand grasping the handle. It is capable of adjustment toward or from the handle about the shaft 18 into different radial angular positions relative to the axis of the lever to suit the convenience of the operator, and as here shown, the lever is provided with a split or clamp bearing 34 on the shaft 18, which is tightened onto the shaft 18 by means of the screw 35, so that by loosening the screw, the initial position of the lever arm 21 may be varied or it may be varied by applying enough shifting pressure to overcome the friction between the bearing 34 and the shaft 18.

What I claim is:

1. In an automatic fishing reel including a suitable housing for attachment to the handle of a fishing pole and a spool, winding spring mechanism, and motion transmitting means between the same and the spool, all carried by the housing, a brake wheel operable by the motion transmitting means, and a brake member coacting with the brake wheel; the combination of an operating lever pivoted to the housing on an axis substantially parallel to the spindle and including a finger-engaging arm extending outward in a general radial direction from its pivotal axis and a short arm extending into the housing, the brake member overlying the short arm and movable about the axis of the lever relatively thereto, the short arm and the brake member having interlocking means coacting with a lost motion for effecting movement of the brake member out of its braking position, upon movement of the lever in one direction and normally permitting pivotal movement of the brake member relatively to the lever, and spring means for resisting movement of the operating lever and the brake member.

2. In an automatic fishing reel including a suitable housing for attachment to the handle of a fish pole, a spool, winding spring mechanism, motion transmitting means between the same and the spool, all carried within the housing, a brake wheel operatively connected to the motion transmitting means, the brake wheel being a ratchet, and brake member comprising a pawl coacting with the ratchet wheel; the combination of an operating lever pivoted to the housing on an axis substantially parallel to the axis of the reel and including a finger-engaging arm extending radially outward from its pivotal axis, and a short arm extending inwardly into the housing, the pawl overlying the short arm and being pivoted concentric with the axis of the lever, the short arm and the pawl being connected by a lost motion permitting ratcheting action of the pawl and operable to shift the pawl out of engaged position upon operation of the lever from normal position, and spring means acting on the pawl and the lever to return the lever to its normal position and press the pawl against the brake wheel.

3. In an automatic fishing reel including a suitable housing for attaching to the handle of a fish pole, a spool, winding spring mechanism, motion transmitting means between the same and the spool, all carried within the housing, and the housing including spaced apart side plates between which the reel is mounted, a brake wheel within the housing operable by the motion transmitting means, and a brake member coacting with the brake wheel; the combination of a finger lever comprising a rock shaft mounted between the rims of the side plates arranged with its axis substantially parallel to the axis of the spool, a finger-engaging arm mounted on the rock shaft between the side plates and extending in a general direction radially outward, and a short arm mounted on the rock shaft outside of the rim of one of the side plates and extending radially into the housing adjacent the brake wheel, said brake member being mounted on the rock shaft adjacent the short arm, the brake member overlying the short arm, extending into the housing and coacting with the brake wheel, a lost motion connection between the short arm and the brake member for normally permitting the brake member to operate and for shifting the brake member out of engagement with the brake wheel upon operation of the longer arm of the lever, and spring means acting on the shorter arm to return the lever to its initial position and on the brake member to press the brake member against the brake wheel.

4. In an automatic fishing reel including a suitable housing for attachment to the handle of a fish pole, a spool, winding spring mechanism, motion transmitting means between the same and the spool, all carried within the housing, the housing including spaced apart side plates between which the spool is mounted; the combination of brake mechanism and an operating lever therefor including a rock shaft mounted in the rims of the side plates and extending parallel to the axis of the spool, a lever arm mounted on the rock shaft, and a shorter lever arm mounted on the rock shaft and extending into the housing, a brake member operable thereby within the housing, the longer lever arm being mounted on the rock shaft between the rims of the side plates and the short arm being mounted on one end of the rock shaft outside of one of the side plates and extending through the side plate into the interior of the housing, the brake member being a pawl mounted on the rock shaft and having a rocking movement relatively thereto, the pawl overlying the short arm, the short arm and the pawl being connected together by a lost motion connection permitting ratcheting of the pawl, a ratchet wheel connected in the motion transmitting means to be actuated thereby, with which the pawl coacts, and spring means acting on the short arm of the lever and on the pawl to return the lever to its starting position and to press the pawl against the ratchet wheel.

5. In an automatic fishing reel including a suitable housing for attachment to the handle of a fish pole, a spool, winding spring mechanism, motion transmitting means between the same and the spool, all carried within the housing, a brake wheel operatively connected to the motion transmitting means, the brake wheel being a ratchet wheel, and a brake member comprising a pawl, coacting with the ratchet wheel; the combination of a finger lever pivoted to the housing on an axis substantially parallel to the axis of the spool and including a finger-engaging arm extending radially outward from its pivotal axis and a short arm extending inwardly into the housing, the pawl overlying the short arm and being pivoted concentric with the axis of the lever, the short arm and the pawl being connected by a lost motion permitting ratcheting action of the pawl and operable to shift the pawl out of engaged position, upon operation of the lever from normal position, and spring means acting on the pawl and the lever to return the lever to its normal position and press the pawl against the brake wheel, the long arm of the lever being adjustable relatively to the shorter arm into different initial radial positions.

6. In an automatic fishing reel including a suitable housing for attachment to the handle of a fish pole, a spool, winding spring mechanism, motion transmitting means between the same and the spool, all carried within the housing, the housing including spaced apart side plates between which the spool is mounted, a ratchet brake wheel within the housing operable by the motion transmitting means, and a brake member coacting with the brake wheel; the combination of an operating lever comprising a rock shaft mounted between the rims of the side plates arranged with its axis substantially parallel to the axis of the spool, a finger-engaging arm mounted on the rock shaft between the side plates and extending in a general direction radially outward, a short arm mounted on the rock shaft outside of the rim of one of the side plates and extending radially into the housing adjacent the brake wheel, the brake member being mounted on the rock shaft adjacent the short arm, the brake member overlying the short arm, extending into the housing and coacting with the brake wheel, a lost motion connection between the short arm and the brake member for normally permitting the brake member to ratchet and for shifting the brake member out of engagement with the brake wheel upon operation of the longer arm of the lever, spring means acting on the shorter arm to return the lever to its initial position and on the brake member to press the same against the brake wheel, the long arm of the lever being adjustable into different angular positions about the rock shaft.

ALFRED D. MAURY.